Oct. 11, 1938. C. C. TAYLOR ET AL 2,132,520
MEANS AND METHOD OF RECORDING EYE MOVEMENTS
Filed Feb. 13, 1937  5 Sheets-Sheet 1

Inventor
Carl C. Taylor
James Y. Taylor
By
Jack A. Ohley
Attorney

Oct. 11, 1938.   C. C. TAYLOR ET AL   2,132,520
MEANS AND METHOD OF RECORDING EYE MOVEMENTS
Filed Feb. 13, 1937   5 Sheets-Sheet 2

Inventors
Carl C. Taylor
James Y. Taylor
By Jack Ashley
Attorney

Oct. 11, 1938.  C. C. TAYLOR ET AL  2,132,520
MEANS AND METHOD OF RECORDING EYE MOVEMENTS
Filed Feb. 13, 1937   5 Sheets-Sheet 3

Inventor
Carl C. Taylor
James Y. Taylor

By Jack A. Ashley
Attorney

Oct. 11, 1938. C. C. TAYLOR ET AL 2,132,520
MEANS AND METHOD OF RECORDING EYE MOVEMENTS
Filed Feb. 13, 1937 5 Sheets-Sheet 5

Fig. 13

INVENTOR
Carl C. Taylor
BY James Y. Taylor
Harry H. Styll
ATTORNEY

Patented Oct. 11, 1938

2,132,520

UNITED STATES PATENT OFFICE 2,132,520

MEANS AND METHOD OF RECORDING EYE MOVEMENTS

Carl C. Taylor, Brownwood, Tex., and James Y. Taylor, Southbridge, Mass., assignors to Educational Laboratories, Inc., Brownwood, Tex., a corporation of Texas Application February 13, 1937, Serial No. 125,674

10 Claims. (Cl. 88—20)

This invention relates to new and useful improvements in eye photographing devices and has particular reference to novel means and method of recording eye movements.

This application is a continuation in part of our co-pending application Serial Number 711,942, filed February 19, 1934 for Means and method of recording eye movements.

One object of the invention is to provide an improved device for photographing movements of the human eye.

Another object of the invention is to provide a compact device for photographing the binocular eye movements of a person while reading and which will record the binocular movements of the eyes simultaneously either with or without the patient wearing correction lenses before the eyes.

Another object is to provide means in an eye movement photographing device whereby only the light reflected by the corneas of the eyes may be sharply focused on the photographic recording film of the device and which will greatly magnify the minute movements of the eyes with the film at a relatively short distance from the eyes.

Another object of the invention is to arrange the fixation means or reading matter, sources of illumination, and eye movement focusing means at such an angular relation to each other that substantially only light reflected from the corneas of the eyes will be reflected into the focusing means.

Another object is to control the speed of travel of the moving film so as to provide means whereby the speed of reading and the binocular movements of the eyes at said speed may be quickly, easily, and accurately determined.

Another object is to provide an apparatus for making photographic records of the binocular eye movements of a person while reading or observing accommodation stimulating indicia, which has means for positioning the person's head relative to the objective of the photographing apparatus so that in the case of a person wearing corrective lenses, the reflections from the lenses will not interfere with the taking of the photographic record.

Another object is to provide a novel means and method of determining the muscular imbalance or imbalance of innervation of the muscles which control the accommodation and vergence functions of the eyes.

Another object is to provide an improved apparatus for readily determining the cooperation or lack of cooperation of the binocular vision functions of the two eyes during the person's normal reading by photographically recording the simultaneous movements of the person's eyes on a photographic film which is moved at a constant speed, thereby giving a graphic record of the relative movement of the person's eyes at succeeding time intervals while the person is reading.

Another object of the invention is to provide an improved device for photographing eye movements, which can be operated in a lighted room, thereby eliminating the necessity of photographing in a dark room.

Still another object of the invention is to provide an improved device for photographing eye movements of a person while reading, having means for recording said movements on a motion picture film which travels at a predetermined rate of speed, whereby the length of time taken for the reading may be quickly and easily ascertained by observing the film.

A further object of the invention is to provide an improved device for photographing the eye movements of a person reading, which is cheap and simple in manufacture and which takes up very little space when in use, and which is also readily portable.

An important object of the invention is to provide an improved device having means for focusing eye movements on a film, whereby said movements are recorded thereon, and also having a simple adjustment for the focusing means.

Still another object of the invention is to provide an improved device for photographing the eye movements of a person while reading and including means for holding the person's head rigid during photographing, said means being adjustable for each person.

Another object of the invention is to provide an improved device for photographing eye movements which includes lenses for focusing the eye images on a traveling film, said lenses being mounted so as to be universally adjusted manually by the operator.

A still further object of the invention is to provide lenses for focusing eye images on a traveling film and a view finder including a mirror on to which the images are focused, the images on the mirror being visible to the operator through a window of ground glass, whereby the correct adjustment of the lenses is readily obtained.

Another object of the invention is to provide a device for recording the eye movements on a film, and having means for removing that portion of the film on which the movements are recorded from the device, without disturbing the remainder of the unrecorded film in said device, whereby the recorded portion may be taken into a "dark room" for development.

An important object of the invention is to provide an improved eye photographing machine having text or indicia to be read by the subject during the photographing, and having means for concealing this test from the subject while preliminary adjustments and observations are made prior to the actual photographing.

A construction designed to carry out the invention will be hereinafter described, together with other features of the invention.

The invention will be more readily understood from a reading of the following specification and by reference to the accompanying drawings in which an example of the invention is shown, and wherein.

Photographic devices for recording the movements of the eyes have, in most instances in the past, been designed for laboratory use and as far as we are aware, lenses having a long focus were used to focus the eye movements on to the recording film. The object of using a long focus lens was to magnify the minute movements of the eyes so that they could be readily distinguished on the film. Because of said long focus lenses it was essential to use a relatively long housing. This, therefore, made the prior art instruments very cumbersome and impractical for commercial use. Most prior art instruments photographed only the movements of one eye and for this reason did not provide a binocular record of the eye movements whereby the binocular coordination of the two eyes could be studied.

Due to the fact that most of these prior art instruments only recorded the monocular movements of an eye, errors of accommodation as well as errors of vergence could not be studied, as no means were provided on the record whereby the movement of one eye could be compared with the movement of the other eye as used binocularly, for example, when reading.

It was also found that with most prior art instruments, photographic records of the eye movements could not be obtained when corrective lenses were in position before the eyes, as it was impossible in most all instances to obtain a satisfactory photographic record of the eye movements through said corrective lenses.

In view of the fact, therefore, that we are particularly concerned in photographing the binocular movements of the eyes under normal conditions of use in order to determine the true action of the eyes and whether or not there are any indications of muscular errors, errors of refraction, etc., or any other deficiencies present, it was quite essential that the eyes be photographed through the corrective lenses. With this problem in mind and with the problem of forming simple, efficient, and economical means for photographing the binocular movements of the eyes simultaneously, and which although compact in structure would enable the magnifying or amplifying of the minute movements of the eyes so as to obtain records which might be easily and accurately studied, we carefully considered the problems involved and carefully designed and computed the various parts of our device so that the physical properties and characteristics of said device were such as to enable us to accomplish the results desired, particularly that of providing an instrument practical for commercial use in small offices.

Figures 3, 8, 9:
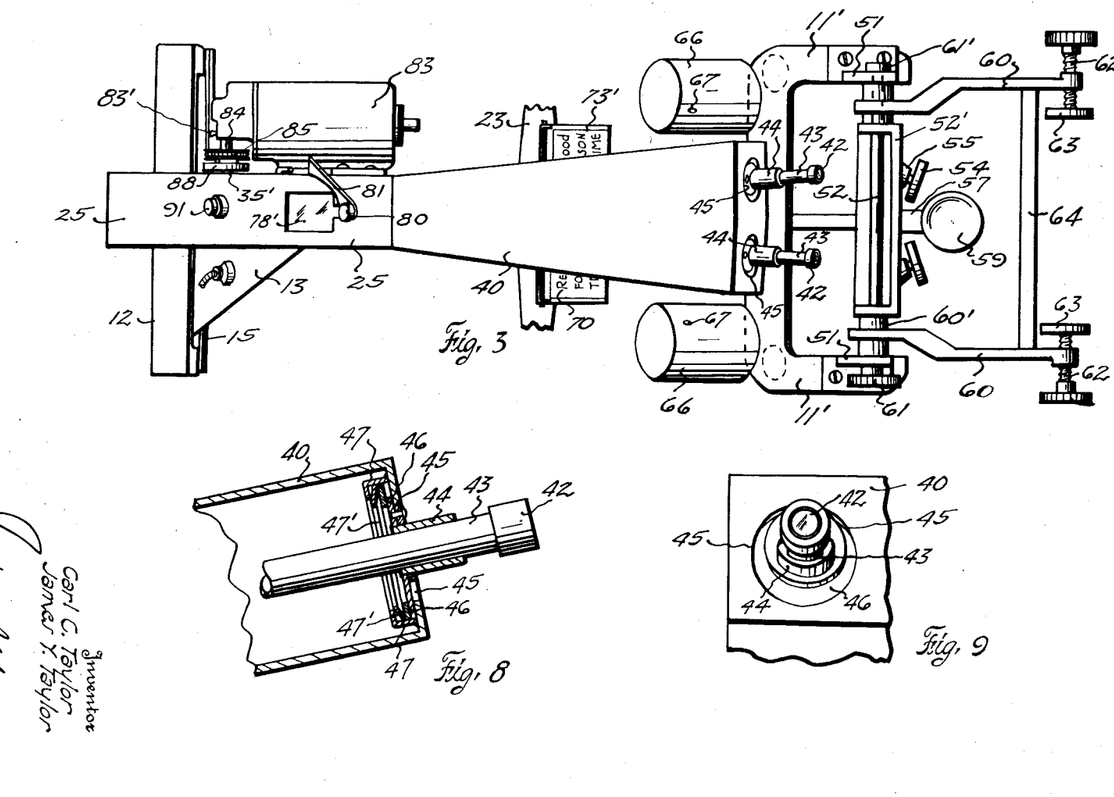
Figure 3 is a plan view of the same.
Figure 8 is a detail sectional view of the lens mounting.
Figure 9 is a partial front elevation of the same.
Figure 4:
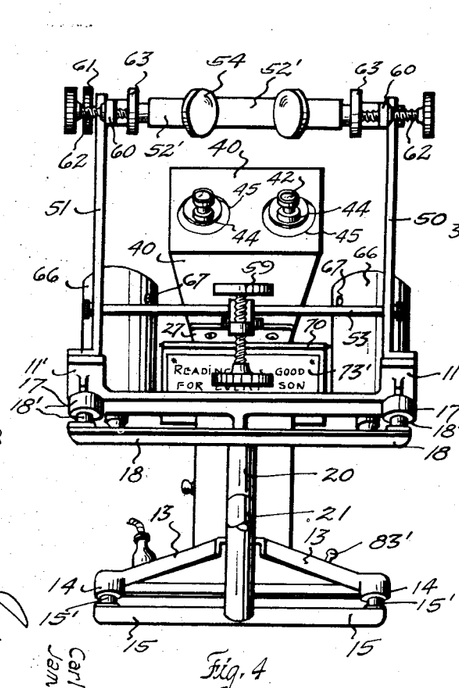
Figure 4 is an end elevation of the same.

In the drawings, the numeral 10 designates a frame which includes a longitudinal bar 11 having a transverse supporting member 12 rigidly secured to its rear end by triangular shaped brace members 13 (Figure 3). Although the member 12 is shown as a separate piece and secured to the bar 11, it can be made integral therewith. The forward end of the bar 11 is formed with a flat yoke 11'.

Figures 1, 11:
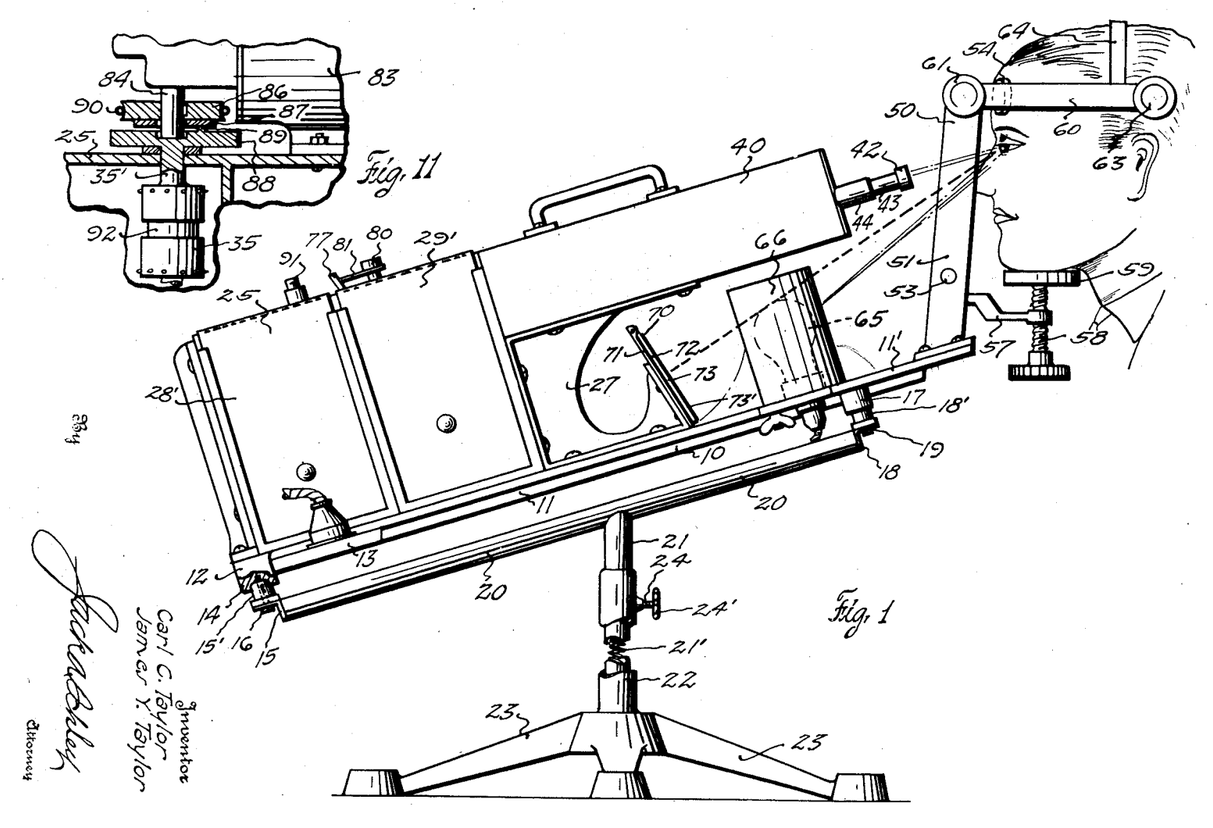
Figure 1 is a side elevation of an eye photographing device constructed in accordance with the invention.
Figure 11 is a sectional detail of the same.

The member 12 has depending lugs 14 at its ends and a transverse angle bar 15 is fastened by bolts 16 to the lugs. Suitable rubber feet or washers 15' are inserted between the lugs and the bar, the bolts 16 passing through the angle bar and washers, and being fastened into the lugs, as shown in Figure 1. Lugs 17, similar to the lugs 14, depend from the shoulders of the yoke 11' and have a transverse angle bar 18 secured thereto by bolts 19. Rubber washers 18' are positioned between the lugs and angle bar. A longitudinal tubular rod 20 has its ends secured to the central portions of the angle bars and has a tubular vertical depending leg 21 made integral therewith. It is pointed out that the rod 20 is positioned at an angle in a horizontal plane, the leg 21 being substantially vertical.

The lower end of the leg is slidable in a tube 22 extending upwardly from a stand 23. A set screw 24 having a suitable hand knob 24' is threaded through the tube 22 and its inner end engages the leg 21 to hold said leg in a desired position within the tube. It is obvious from the foregoing that the frame 10 is carried by the longitudinal rod 20 and may be raised or lowered by adjusting the leg 21 in the tube 22. To counterbalance the weight of the frame and to make for easier lifting thereof, a coiled spring 21' is positioned within the leg and exerts its pressure upwardly (Figure 1). It is noted that since the rod 20 is constructed at an angle in a horizontal plane, the frame carried thereby is at all times in the same position, regardless of the position of the leg 21 within the tube 22.

A housing 25 (Figures 1 and 2) is mounted on the bar 11 at the rear end thereof and is secured at its rear by a vertical brace 26 and at its forward end by a suitable bracket 27. The housing is divided into two compartments 28 and 29, in which the entire camera mechanism is mounted. The film supply reel 30 is demountably secured on a shaft 31 in the forward compartment 29. The film 32, unwinding from the reel, passes upwardly through a guide channel 33 on the rear wall of the compartment 29, and then through an opening 34 in said wall and into the rear compartment 28. In the upper end of this latter compartment and adjacent the opening 34, a film driving sprocket 35 is mounted. The film passes over this sprocket and then downwardly through an opening 36' in a film winding box 36. The box 36 is removably mounted in the compartment 28 and has a film winding reel 37 journaled on a bearing 38 carried on a shaft 39 supported in one side of the housing 25. The inner end of the shaft 39 has a slot 39' (Figure 12) which is arranged to engage a pin 40 which extends transversely within the reel 37. It is obvious that rotation of the shaft will drive the film reel 37, when said reel is in position within the compartment 28. The compartments are normally closed by sliding side doors 28' and 29'.

The housing is provided with an elongated flared extension 40 which extends forwardly therefrom, being supported by and secured to the top of the bracket 27. The rear end of the extension is open, whereby the interior of the case communicates with the interior of the forward compartment 29 of the housing. A transverse horizontal partition 41 is positioned in the compartment 29 and this partition is substantially flush with the bottom of the extension, thus forming a continuous passage from the forward end of said extension to the rear wall of the compartment 29.

The lenses 42 of the camera (Figures 8 and 9) are mounted to be universally adjustable in the forward wall of the extension 40. Each lens is supported in a tube 43 which is slidably mounted in a sleeve 44, which extends through a circular opening 45 in the front wall of the extension. The sleeve is eccentrically mounted in a disk 46, which is larger in diameter than the opening 45, whereby forward displacement of the disk and sleeve is prevented. The disk 46 is eccentrically confined within a ring 47 which is secured to the rear of the front wall of the extension by a spring washer 47' suitably secured to the inner periphery of the ring. It is obvious that due to the eccentric mounting of both the sleeve 44 and the disk 46, each lens 42 carried by the sleeve is universally adjustable in all directions. By mounting the lenses as shown, a maximum adjustment of said lenses is had in a minimum amount of space.

A head clamp 50 (Figures 1 to 4) is provided at the forward end of the machine. This clamp is arranged to hold the head of the person in position during the photographing of his eye movements. The clamp includes a pair of standards 51 which extend upwardly from the arms of the yoke 11'. The standards are connected and braced at their upper ends by a transverse tie rod 52 which is fastened to said standards. A similar rod 53 braces the lower end of the standards. The bar 52 has a transverse angle bar 52' secured thereto and this bar carries a pair of loosely pivoted forehead rests or stops 54, suitably secured in bearings 55 made integral with the bar, whereby said stops are adjustable with relation to said bar.

A support 56 is secured on the lower transverse rod 53 at the central portion thereof and a bracket 57 is adjustably secured to the support by a set screw 58. The screw is provided with a knurled knob so as to be readily turned by hand. The bracket extends forwardly from the support and has a bearing 57' at its outer end.

A screw 58' having a knurled knob at its lower end is threaded through the bearing and carries a chin rest 59 at its upper end. It is obvious that the chin rest can readily be raised or lowered with relation to the bracket by merely rotating the screw.

As shown in Figure 1, the person whose eye movements are to be photographed places his chin on the chin rest 59 and his forehead against the stops 54 on the transverse bar 52'. For clamping the sides of his head and to prevent transverse movement of the same, a pair of arms 60 extend forwardly from the upper end of each standard. The rod 52 passes through the rear end of each arm, whereby said arms are pivotally mounted thereon. Suitable bearing members 60' are positioned on the rod 52 between the arms and the standards 51. The rod has a head 61' on one end thereof and has a nut 61 on its opposite end. By tightening the nut 61 the arms 60 are frictionally clamped in position with relation to the standards.

A screw 62 having a knurled knob is threaded through the outer or forward end of each arm and each screw carries a clamping disk 63 at its inner end. The arms are connected and braced by a bar 64. Thus, it will be seen that when a person's head is placed in the clamp 50 and the proper adjustments of the clamping disks 63 and the chin rest 59 are made, the head is held in a rigid, immovable position. The adjustments are easily and quickly made so that the clamp will readily fit any size head.

For supplying sufficient and proper light for photographing the eye, a pair of suitable electric lamps 65 are provided. Each lamp is positioned within a cylindrical casing 66. The casings are mounted, one at the rear end of each arm 11' of the yoke 11. Each casing is provided with a small opening 67 in its forward side, and these openings are so positioned that light rays escaping therefrom will reflect directly into the eyes of the person whose head is held in the clamp 50 (Figure 1). It is this light cast into the eyes and reflected by the cornea of the eyes which is picked up by the lenses 42 and focused on the film. A small square opening 68 is provided in the rear wall of each lamp casing 66 to permit the escape of light. This escaping light serves to illuminate the reading cards, which are supported in a holder 70.

The holder is secured to the forward end of the bracket 27 and includes a rigid card holder 71 which carries a card 72 with indicia thereon. A flap 73 of the same size as the holder 71 is pivoted to the holder at its upper end and when the flap is in its lowered position, it covers the card 72, hiding it from the view of the subject. If desired, a second card 73' can be supported on the front side of the flap. It is the indicia on these cards that is read by the person while his eye movements are being photographed.

Figure 6:
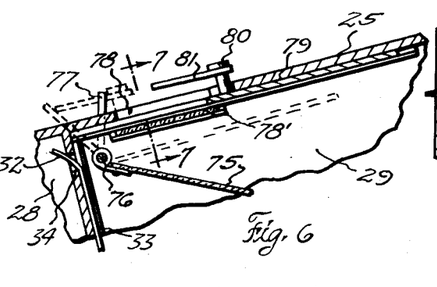
Figure 6 is a partial longitudinal sectional view of the view finder.
Figure 7:
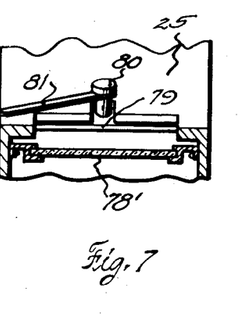
Figure 7 is a vertical sectional view of the same taken on the line 7—7 of Figure 6.

For obtaining the correct adjustment of the lenses so that the light rays reflected from the eyes will be focused directly on to the center of the film, a view finder (Figures 2, 6 and 7) is provided in the housing 25 above the compartment 29. The finder includes a mirror 75 which is secured at its upper end to a rock shaft 76 which is journaled in the housing 25, adjacent the opening 34 in the rear wall of the compartment 29. One end of the shaft extends outwardly through the wall of the compartment and is provided with a short vertical rocker arm 77. By swinging the arm the mirror is swung to either lie across the passage between the lenses and the film or to be in a raised position against the underside of the top of the housing 25 to unobstruct the passage.

Figures 2, 10, 12:
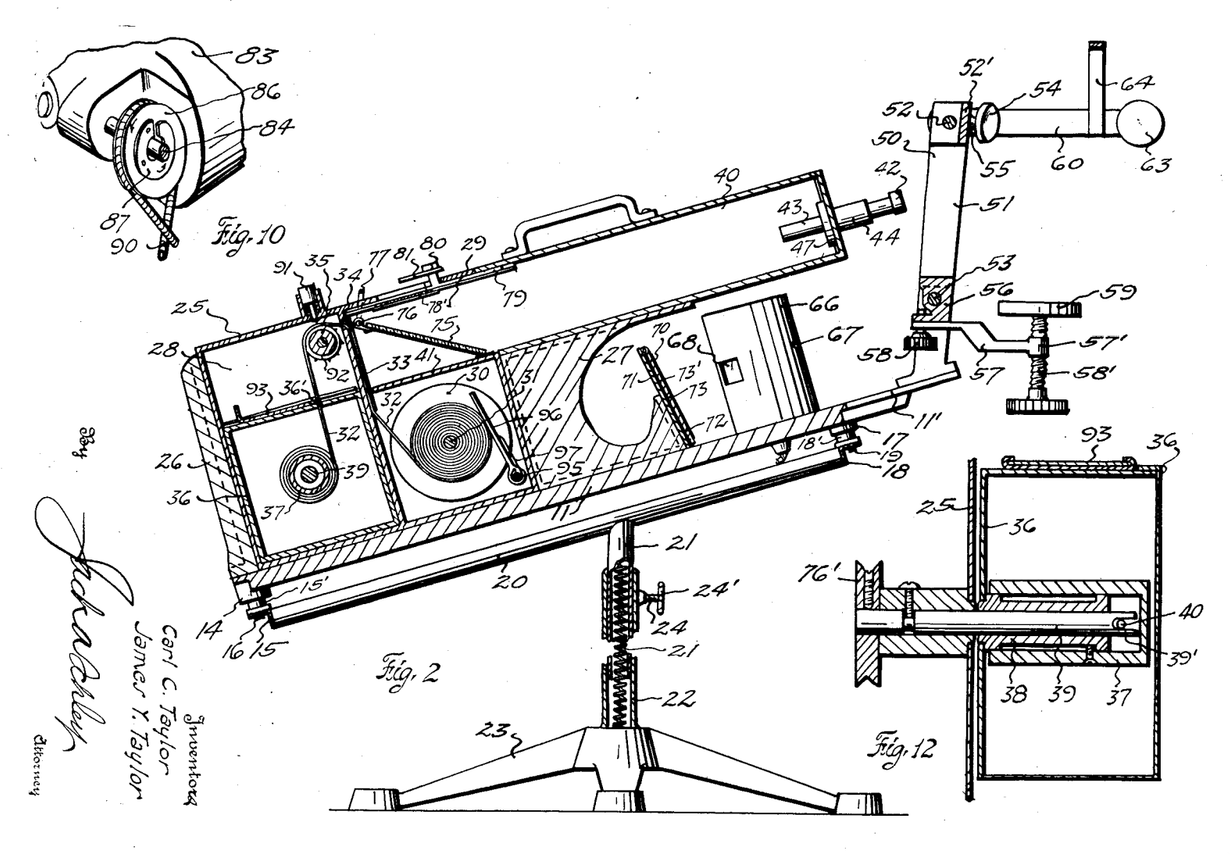
Figure 2 is a longitudinal sectional view of the same.
Figure 10 is a detail of the film drive sprocket clutch.
Figure 12 is a detail of the film winding reel drive connection.

With the mirror in a lowered position, as shown in Figure 2, the light rays coming through the lenses are caught thereby and are visible on a section of ground glass 78' which covers an opening 78 in the top of the housing. The opening is arranged to be closed by a sliding panel 79 provided with a suitable hand knob 80. Attached to the knob is a short arm 81 which extends rearwardly and outwardly therefrom in the path of the rocker arm 77 of the rock shaft 76. Thus, after the correct focus of the lenses is obtained, the panel 79 is slid rearwardly to close the opening 78 and the arm 81 strikes the rocker arm 77 to swing it rearwardly. The swinging of the arm 77 rotates the shaft 76 to swing the mirror upwardly against the underside of the top of the housing 25, whereby the passage between the lenses is unobstructed and the light rays are focused directly on the film.

For driving the film through the device, an electric motor 83 is mounted on one side of the housing 25 and is controlled by a suitable switch 83'. The drive shaft 84 of the motor has connection through a clutch 85 with the shaft 35' of the drive sprocket 35. The particular construction of the clutch is clearly shown in Figures 10 and 11. The clutch includes a pulley 86 mounted on the end of the drive shaft 84 and this pulley has a split spring washer 87 fastened to its outer face. The sprocket shaft 35' has an enlarged knurled hand disk 88 on its outer end and the outer face of the disk is adjacent the spring washer 87. A pin 89 on the outer face of said disk is arranged to be engaged by the end of the split spring washer when the pulley 86 is rotated. By observing Figure 10, it will be seen that the disk 88 can be rotated in a counterclockwise direction by hand and the pin 89 will ride against the outer face of the spring washer depressing the same and making no connection therewith. Thus, the sprocket 35 which is rotated when the disk is turned can be rotated manually without affecting any of the other parts. However, the clockwise rotation of the disk and sprocket is prevented by the pin 89 striking the projecting end of said spring washer. When the motor is operating, the pulley 86 and spring washer 87 are rotated in a counterclockwise direction and the projecting end of the washer will engage the pin and rotate the disk 88 and sprocket shaft 35' therewith, whereby the sprocket 35 is driven to cause the film to unwind from the supply reel 30 to the take-up reel 37.

To take care of slack in the film and keep the film taut during operation, a pulley 76' is mounted on a drive shaft 39 (Figure 2), which drives the film winding reel. This pulley is connected with the pulley 86 on the motor shaft by a crossed spring drive 90. Thus, while the drive sprocket 35 is rotating to drive the film through the housing, the winding reel is also rotated to hold the film taut at all times.

The person whose eye movements are to be photographed places his head in the head clamp 50. The clamping disks and chin rest are adjusted to position his head so that the light rays from the lamps 65 emitting through the openings 67 in the cylindrical casings 66 will shine directly in his eyes. By disposing the frame and machine at an angle, it is possible for a person who is wearing eye glasses with bifocal lenses, to observe the cards on the card holder through said bifocal lenses, whereby his eye movements will be photographed under normal reading conditions. It is noted that at first the motor is not operating. The panel 79 (Figures 6 and 7) is then slid upwardly to uncover the opening 78 in the top of the housing 25. This movement permits the mirror 75 to swing downwardly under its own weight, across the passage between the lenses 42 and the film 32. The person is now observing the card 73' on the flap 73. The light rays from the lamps 65, which are shining in the eyes, are reflected from the cornea of the eyes into the lenses.

As can be seen from the drawings the head rest is designed to position a person's head so that his eyes are in front of each of the camera objectives and so that the longitudinal axis of the latter will be inclined downward relative to the plane of straight ahead vision of the eyes from the front to the back of the camera. The rays of light which project from the small holes 67 in the covers 66 strike the eyes and corrective lenses at such an angle that the reflections produced by the surfaces of the corrective lenses will not be focused on the film when the camera lenses 42 are adjusted to focus the light reflected from the eyes on said film.

It will be noted that the angle the rays of light from the holes 67 make with the camera axis is approximately the same as the angle the axis of the camera objectives make with the plane of straight ahead vision. Although this angle is not extremely critical, it is important that the position of the light source be such that the rays from the virtual images of the corrective lenses are not brought to a focus on the film when lenses 42 are adjusted to focus the rays from the virtual images of the reflections from the eyes.

From much experimenting we have found that if the axes of the camera objectives make an acute angle or are inclined approximately twenty-five degrees with respect to the plane of straight ahead vision of the patient's eyes, the reflections from the corrective lenses will not prevent taking a photographic record of the reflections from the eyes, that is, providing the rays of light from the source of illumination strike the cornea from an angle considerably above or below the axis of the camera objective. This is partly due to the fact that the plane of the corrective lenses is usually inclined slightly forward at the top. The source of illumination may be above or below the axis of the photographic objective, but when the rays project from within the plane of the axes of the objective lenses the reflections from one eye glass interferes either with the record of the corresponding eye or with the record of the other eye, depending upon the angle the rays make with the axes of the camera objectives.

Figure 13:
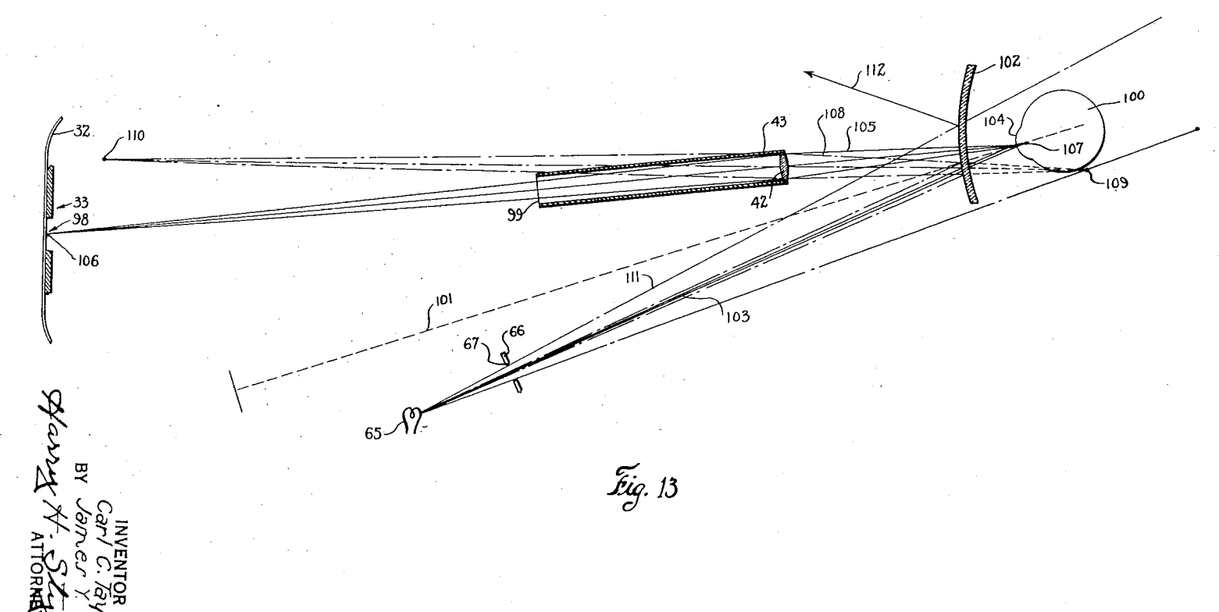
Figure 13 is a diagrammatic view illustrating the function of the device embodying the invention as regards its use in photographing the movements of the eyes through correction lenses.

This will probably be better understood by referring to Figure 13 which diagrammatically illustrates how it is possible with the device embodying our invention to photograph the eye movements through corrective lenses. In this figure the tube 43 supporting the focusing lens 42 of the camera is diagrammatically illustrated. The film 32 is shown as being moved in the rear of the guide channel 33 in the rear wall of the compartment 29. This guide channel is provided with a stop opening 98 thereby exposing a portion only of the film depending, of course, upon the area of said stop opening.

The tubular member 43 is formed relatively long so that the end 99 thereof functions as a stop opening along the path of the light focused from the cornea of the observer's eye illustrated at 100. The angle of the line of sight while viewing the card 72 is illustrated at 101. The angular position of the source of illumination 65 and small opening 67 of the lamp housing 66 relative to the axis of the focusing means and line of sight 101 is also diagrammatically illustrated. The prescription lens 102 is diagrammatically illustrated in its related position before the eye of the observer.

Now referring more particularly to the bundle of light rays 103 which are directed to the cornea 104 of the observer's eye, it will be noted that the said rays will be returned as illustrated at 105 into the focusing system 42 of the camera. The focusing system, which in this particular instance comprises a short focusing lens 42, will focus the said rays 105 on to the film 32, as illustrated at 106.

The focusing lens 42 is of such power and is so positioned relative to the eye, and the film is supported at such a distance relative to this position, that when the eye is carried through its successive minute movements during reading, the said movements will be greatly magnified so that it may be easily distinguished on the film. This short focus lens thereby enables the magnifying of the minute movements of the eyes without the necessity of having a relatively long light chamber and is greatly responsible for the great reduction in size of the instrument embodying our invention.

The light rays 105 reflected from the cornea are illustrated as originating from the virtual focal point 107 of the corneal surface 104. The light rays 103 striking the surface of the lens 102 will be reflected along the path of the dot and dash lines illustrated at 108 coming as from the virtual focal point 109. It will be seen that the stop opening 99 formed by the end of the tube 43 does not receive any of these light rays. It also is apparent that the light rays 105 which come to a focus as illustrated at 110 in a plane in front of the film, even if the stop opening 99 were not used, would not be focused in the exposed area of the film 32, which in this instance, is in the vicinity of the stop opening 98.

The reason, therefore, that the light rays reflected by the corrective lens 102 are not focused on the film, is because of the angular relation of the cone of light 103 relative to the axis of the focusing system and to the line of sight of the eye viewing the reading matter at 73. For example, if the light source 65 were nearer the axis of the focusing means, the light rays reflected by the surface of the lens 102 would be more nearly parallel with the light rays 108 reflected from the surface of the lens and the said light rays 108 would thereby be directed to the exposed area of the film, as has been usual in the prior art.

By controlling the above angular relations we have made it possible to photograph through correction lenses without interference by said correction lens. To aid in bringing about this result, it will also be noted that the stop openings 99 and 98 will greatly cut out extraneous light rays reflected by the surface of the lens 102. The angle at which the plane of the lens is supported relative to the longitudinal axis of the focusing system also plays an important part.

It will be noted that the head rest for supporting the head of the patient is in a vertical plane and that the axis of the focusing system is inclined downwardly relative to said vertical plane. This causes the reflected rays, as illustrated by the lines 111 and 112, to be directed at a greater angle relative to the axis of the focusing means. The image focused at 110 will thereby be further away from the exposed area of the film 32.

It will be noted that due to the particular arrangement for supporting the head of the patient and the angular tilt of the photographic instrument, the eyes look through the lower portions of the lenses so that in instances where bifocal or multifocal lenses are used having specially corrected reading fields, the movements of the eyes may be photographed through said fields.

The film 32 is preferably moved at a constant predetermined speed during the photographing so that the speed of reading may be calculated by the number of words in the lines exposed and the time of said exposures.

It is also pointed out that the diameter of the lens 42 as compared with the correction lenses 102 is very small. This also eliminates the entry of extraneous light rays into the focusing system of the camera.

It is to be understood that the above Figure 13 is diagrammatic and is used herein only to illustrate the function of the device embodying our invention.

If in cases of corrective lenses of unusually high surface powers (high curvatures) lens reflections should enter the focusing system and be brought into the exposed area of the film, slight re-adjustment of the patient's glasses by tilting or side adjustment of the focusing system assures their total elimination.

The angle of the mirror 75 is such that the operator can observe the images therein through the ground glass 78' which covers the opening 78. By grasping the tubes 43, which carry the lenses 42, one in each hand, the operator can readily focus the images directly on to the center of the mirror, observing said images on the glass 78' during the adjusting. The mounting of the lenses is an important feature of the machine for it permits a quick, easy and simple adjustment to be made manually without the use of gears or mechanical means. When the adjustment of the lenses is made, the panel 79 is slid rearwardly to cover the opening. This sliding action swings the mirror upwardly out of the way, due to the arm 81 carried by the knob on the panel engaging and swinging the rocker arm 77.

The reflection from the eye is now focused directly on the film through the lenses. At this time the flap 73 of the card holder 70 (Figures 1 and 2) is swung upwardly and the card 72 held by the rigid card holder 71 can now be observed by the person. At this point the motor is turned on and the film travels through the housing 25 from the feed reel 30 to the take-up reel 31. The person now reads the indicia on the card 72, his eyes having become accustomed to observing the card by his observance of the first card 73', and the movement of his eyes is recorded on the film. If there is any hesitancy or defects in his eyes during reading, it is clearly shown on the film.

It will be readily apparent that the coordination or lack of coordination of the eyes of the person will be shown up very distinctly by observing the distance between the records of the individual eyes. Since the film is moved at a constant speed, the variation in the relative movements of the eyes will be shown as a function of time.

These records are very valuable in determining the type of refractive lenses necessary to relieve eye strain or the kind of orthoptic training which will give the most beneficial results. Also such a binocular record will show distinctly which of the eyes is restless in case of nystagmus.

If the binocular record shows that the vertical lines of each of the individual records are substantially parallel, this will indicate that the person is able to hold his eyes relatively fixed on each fixation point while if the vertical lines are not parallel, the patient is suffering from overconvergence or underconvergence. It should be stated here that since each of the camera objectives consists in only one lens 42 and the film moves upwardly, the movement of the record on the film is opposite to the movement of the eye. It is also to be noted that if the person's eyes are easily fatigued, this will be shown up as a variation in the distance between the individual records after the person is caused to read for a period of time.

The speed of travel of the film can readily be adjusted so that the time elapsed for the reading of the card can be ascertained by the length of film taken to record the reading. If it is desired to record more than one person's eye movements on the same roll of film without removing the length of film of each recording immediately afterward, a spring-pressed plunger 91 is positioned in the top of the housing 25 above the drive sprocket 35. The sprocket has a radial central groove 92 and when the plunger is depressed the pointed lower end of said plunger passes through the film into the groove to punch a hole in the film. Thus, each time a recording of one person's eye is taken, the plunger is depressed, whereby a hole is made in the film. Then, after the entire roll of film is used each recording is separated by a hole in the film.

If it is desired to remove each recording immediately after taking, a sliding blade 93 is provided on top of the take-up reel box 36 (Figure 2). This blade is arranged to slide over the opening 36' in the top of the box and it is obvious that when film is passing through this opening the sliding of the blade will cut the film. The box 36 may then be removed from the compartment 28 and the recorded film developed. The box is then returned to the compartment and the film again wound on the winding reel, ready for the next recording.

Figure 5:
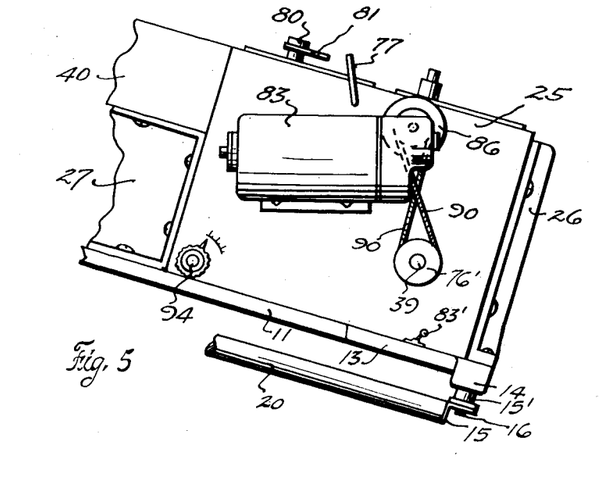
Figure 5 is a partial elevation of the side opposite that shown in Figure 1.

For ascertaining the amount of film on the feed roller an indicator 94 (Figures 2 and 5) is secured on the outer end of a rock shaft 95, which is positioned in the lower front end of the compartment 29. The rock shaft carries an elongated arm 96 which is held in constant engagement with the film roll 32 by a spring 97 secured on said shaft and bearing against the arm. As the film is used and the roll diminishes, the arm 96 remains in engagement with the roll and is swung to rotate the rock shaft 95. This swings the indicator 94 on the outside of the casing 25 to indicate the amount of film remaining on the feed reel 30 without looking into the interior of the compartment 29.

The description which has been given recites more or less detail of a particular embodiment of the invention, which is set forth as new and useful; however, we desire it understood that the invention is not limited to such exact details of construction, because it is manifest that changes and modifications may be made, within the scope of the appended claims, without departing from the spirit of the invention.

Having described our invention, we claim:

1. A device for photographically recording the movements of both eyes of a person simultaneously, comprising a relatively short housing, means for supporting a moving film adjacent one end of the housing with a predetermined area of said film exposed in said housing, means for supporting the head of the person with the corneas of his eyes in front of the end of the housing opposite the film, means for directing a beam of light onto said corneas at an angle which will direct the light reflected by said corneas towards the housing and a pair of focusing members adjustably carried by the end of the housing adjacent the head support each having a relatively small, short focus lens therein of a focal length much shorter than the length of the housing and such that slight adjustments of said lenses toward and away from the head support will enable the light rays reflected by the corneas to be focused on the exposed area of the film with the respective focused images in spaced relation with each other on said film and when the said short focus lenses are in focused position relative to the eyes, the distance of the exposed area of the film from the lenses will be greater than the distance of said lenses from the eyes by a controlled amount which will cause displacements of said focused images in the plane of said film, brought about by minute movements of the eyes as when reading, to be greatly amplified in said plane.

2. A device for photographically recording the movements of both eyes of a person simultaneously comprising a relatively short dark chamber, means for supporting a moving film adjacent one end of the chamber with a predetermined area of said film exposed in said chamber, means for supporting the head of the person with the corneas of his eyes in front of the end of the chamber opposite the film, means for directing a beam of light onto said corneas at an angle which will direct the light reflected by said corneas towards the chamber, a pair of focusing members adjustably carried by the end of the chamber adjacent the head support each having a lens therein of a focal length much shorter than the length of the chamber and such that slight adjustments thereof towards and away from the head support will enable the light rays reflected by the corneas to be focused on the exposed area of the film with the focused images in spaced relation with each other on said film and such that when in focused position relative to the eyes the said lenses will be at a distance from the exposed area of the film greater than the distance of said lenses from the corneas of the eyes and greater than the focal lengths of said lenses by an amount which will cause displacements of the focused images in the plane of said film, brought about by minute movements of the eyes as when reading, to be greatly amplified in said plane.

3. A device for photographically recording the movements of both eyes of a person simultaneously comprising a relatively short dark chamber, means for supporting a moving film adjacent one end of the chamber with a predetermined area of said film exposed in said chamber, means for supporting the head of the person with the corneas of his eyes in front of the end of the chamber opposite the film, means for directing a beam of light onto said corneas at an angle which will direct the light reflected by said corneas towards the chamber, a pair of focusing members adjustably carried by the end of the chamber adjacent the head support each having a lens therein of a focal length much shorter than the length of the chamber and such that slight adjustments thereof towards and away from the head support will enable the light rays reflected by the corneas to be focused on the exposed area of the film with the focused images in spaced relation with each other on said film and such that when in focused position relative to the eyes the said lenses will be at a distance from the exposed area of the film greater than the distance of said lenses from the corneas of the eyes and greater than the focal lengths of said lenses by an amount which will cause displacements of the focused images in the plane of said film, brought about by minute movements of the eyes as when reading, to be greatly amplified in said plane and means having a restricted opening therein between the lenses and exposed area of the film through which the reflected light rays are directed during the focusing thereof on said film.

4. A device for photographically recording the movements of both eyes of a person simultaneously through corrective lenses comprising a relatively short dark chamber, means for supporting a moving film adjacent one end of the chamber with a predetermined area of said film exposed in said chamber, means for supporting the head of the person with the corneas of his eyes in front of the end of the chamber opposite the film, means for directing a beam of light onto said corneas at an angle which will direct the light reflected by said corneas towards the chamber and a pair of focusing members adjustably carried by the end of the chamber adjacent the eyes, said focusing members comprising a pair of tubular supports separately adjustably supported for movement thereof toward and away from the head support and in a direction transversely of said movement and each having a relatively small, short focus lens adjacent the outer ends thereof and being of such a size adjacent their inner ends and of such a length as to form a restricted stop opening through which the light rays reflected by the corneas are directed, the said short focus lenses being of a focal length much shorter than the length of the chamber and such that slight adjustments thereof toward and away from the head support will enable the reflected light rays by the corneas to be focused on the exposed area of the film with the respective focused images in spaced relation on said film and when the said short focus lenses are in focused position relative to the eyes the distance of the exposed area of the film from said lenses, although said light chamber is relatively short, will be greater than the distance of said lenses from the corneas of the eyes and greater than the focal lengths of said lenses by an amount which will cause displacements of said focused images in the plane of said film, brought about by minute movements of the eyes as when reading, to be greatly amplified in said plane, the diameter of the relatively small short focus lenses and the diameter of the inner open ends of the tubular supports being such that light rays reflected at different angles than the angle of reflection from the corneas, as for example, from the surfaces of the corrective lenses before the eyes will not pass directly through said inner open ends and will thereby be prevented from reaching the exposed area of the film.

5. A device for photographically recording the movements of both eyes of an individual simultaneously comprising the combination of a support having a dark chamber, a head support for supporting the head of said individual with the corneas of his eyes in front of one end of the dark chamber, fixation indicia exposed to the view of the eyes of said individual while supported in said head support, and means thereon for directing a beam of light onto the corneas of the eyes at an angle which will direct the light rays reflected by said corneas while viewing said indicia, towards the dark chamber, said dark chamber being relatively short so as to produce a device which is of such a size as to be practical for use in offices having restricted space, the said chamber being provided with means for supporting a moving film with a predetermined area of said film exposed in said chamber adjacent the end thereof opposite the head support and having a pair of focusing members adjustably supported thereon, adjacent the means for supporting the head of the individual, each foscusing member having a relatively short focus lens therein of a focal length much shorter than the length of the chamber and so controlled as compared with the length of the chamber that slight adjustments thereof towards and away from the head support will enable the light rays reflected by the corneas to be focused on the exposed area of the film with the respective focused images in spaced relation with each other on said film and when in said focused position the distance thereof from the exposed area of the film will be greater than their distance from the corneas and greater than their focal lengths by a controlled amount which will cause displacements of said focused images in the plane of said film, brought about by minute movements of the eyes while reading the fixation indicia, to be greatly amplified in said plane.

6. The method of determining the coordination of the binocular movements of an individual's eyes comprising supporting the head of the individual in a fixed position, directing a beam of light onto the corneas of the eyes while held in a relatively fixed position to produce light reflections from said corneas, focusing said reflections in spaced relation with each other in the area of and in the plane at which a film supported for movement in a dark chamber is to be exposed, exposing reading matter within the field of vision of said individual to bring about binocular movements of the eyes while reading said reading matter, continually exposing the film to the corneal reflections of the eyes and moving said film receiving said corneal reflections during the reading of said reading matter to simultaneously photographically record the displacements of the images of the reflected light in the plane of the moving film caused by the movements of the respective eyes during said reading and comparing the recorded image movement track of one eye with the recorded image movement track of the other eye on said film to determine the relative movements of the eyes.

7. The method of determining the coordination of the binocular movements of an individual's eyes and the reading speed and comprehension of said individual comprising supporting the head of the individual in a fixed position, directing a beam of light onto the corneas of the eyes, while the said eyes are held in a relatively fixed position, to produce light reflections from said corneas, focusing said reflections in spaced relation with each other in the area of and in the plane at which a film supported for movement in a dark chamber is to be exposed, exposing reading matter of a given amount within the field of vision of said individual to bring about binocular movements of the eyes while reading said reading matter, continually exposing the film to the corneal reflections of the eyes and moving said film at a given rate of speed during the reading of said reading matter to simultaneously photographically record the displacements of the images of said reflected light in the plane of the moving film caused by the movements of the respective eyes during said reading, comparing the recorded image movement track of one eye with the recorded image movement track of the other eye on said film to determine the relative movements of the eyes, and determining the individual's accuracy of interpretation of the reading matter and length of the recorded image movement tracks for said amount of exposed reading matter and speed of movement of the film to obtain the reading speed and comprehension of said individual.

8. A device for photographically recording the movements of both eyes of a person simultaneously, comprising a dark chamber, means for supporting a moving film in said chamber with a portion thereof exposed to receive reflected light from the corneas of the eyes of an individual whose eye movements are to be recorded, means for locating the head position of said individual relative to said dark chamber, means for directing a beam of light onto the corneas of the eyes of said individual at said head position at an angle whereby the light reflected by said corneas may be directed to the chamber, a pair of focusing members adjustably supported to receive the light reflected by said corneas, each having a lens therein of a focal length shorter than the length of the chamber and such that slight adjustments thereof toward and away from the exposed portion of the film in the direction of the incoming reflected rays of light from the corneas of the eyes will enable said light rays to be focused on the exposed portion of the film and such that when in focused position the said lenses will be at a distance from the exposed portion of the film greater than the distance of said lenses from the effective source of origin of the corneal reflections of the eyes and greater than the focal length of said lenses by an amount which will cause displacements of the focused images in the plane of said film, brought about by minute movements of the eyes, to be amplified in said plane.

9. The method of recording the binocular movements of an individual's eyes comprising locating the head of the individual in a given position, directing a beam of light onto the corneas of the eyes while at said given position to produce light reflections from said corneas, focusing said reflections in spaced relation with each other in the area at which a film supported for movement in a dark chamber is to be exposed, exposing eye fixation means to the eyes of the individual to bring about binocular movements of the eyes while viewing said fixation means, continually exposing the film to the corneal reflections of the eyes and moving said film receiving said corneal reflections during said viewing of said fixation means to simultaneously photographically record the displacements of the images of the reflected light substantially in the plane of the moving film caused by the movements of the respective eyes during said viewing of said fixation means and comparing the excursion of the two eyes by reference to the image movement track of the eyes on said film as produced by said photographing to determine said eye movements while viewing said fixation means.

10. A device for photographically recording the movements of both eyes of a person simultaneously comprising means for locating the head of an individual in a given position, means for directing a beam of light onto the corneas of the eyes at said given position to produce light reflections from said corneas, a dark chamber, a film supported for movement in said dark chamber, means for separately positioning and focusing said reflections in spaced relation with each other in the area at which the film supported for movement in the dark chamber is to be exposed, eye fixation means supported to expose them to the eyes to bring about binocular movements of the eyes while viewing the same, and means for moving the film when receiving said corneal reflections while the eyes are viewing the fixation means to simultaneously photographically record the displacements of the images of the reflected light substantially in the plane of the moving film caused by the respective eyes during said viewing of said fixation means to obtain a record of the excursion of the two eyes by reference to the image movement track of the eyes as produced by the reflected light from the corneas of the eyes on said film.

CARL C. TAYLOR.
JAMES Y. TAYLOR.